United States Patent [19]

Nicolai et al.

[11] Patent Number: 5,480,692

[45] Date of Patent: Jan. 2, 1996

[54] PROCESS TO INCREASE THE RESISTANCE TO TEARING OF A HEAT-RESETTABLE MATERIAL WEB

[75] Inventors: Norbert Nicolai, Dorsten; Heinz Koppe, Castrop Rauxel; Thomas Schwabe, Dorsten; Jürgen Vogel, Leuna, all of Germany

[73] Assignee: Stewing Nachrichtentechnik GmbH & Co., Berlin, Germany

[21] Appl. No.: 231,613

[22] Filed: Apr. 22, 1994

[30] Foreign Application Priority Data

Apr. 22, 1993 [DE] Germany .......................... 43 13 153.0
Apr. 22, 1993 [DE] Germany .......................... 43 43 166.6
Feb. 26, 1994 [DE] Germany .......................... 44 06 406.3

[51] Int. Cl.⁶ .......................... B29C 55/00; B29C 61/02; B65B 53/02; D01D 5/12
[52] U.S. Cl. .................. 428/35.1; 264/209.6; 264/209.7; 264/210.5; 264/230
[58] Field of Search .......................... 264/209.6, 209.7, 264/210.5, 230; 428/35.1

[56] References Cited

U.S. PATENT DOCUMENTS 4,354,997 10/1982 Mizutani et al. .......................... 264/560
4,436,888 3/1984 Copple .......................... 526/348.1
4,705,657 11/1987 Poulin .......................... 264/22
4,797,235 1/1989 Garland et al. .......................... 264/22
4,957,790 9/1990 Warren .......................... 428/34.9
5,043,383 8/1991 Eaton et al. .......................... 525/57
5,106,545 4/1992 Warren .......................... 264/22
5,127,977 7/1992 Eaton et al. .......................... 156/244.11

FOREIGN PATENT DOCUMENTS 2719306 11/1978 Germany .
0021438 4/1983 Germany .
3806660 9/1989 Germany .
4126355 2/1993 Germany .

Primary Examiner—Thomas Hamilton, III
Attorney, Agent, or Firm—Herbert Dubno

[57] ABSTRACT

A process to increase resistance to tearing in a heat-resettable material involves extruding a polymer of a specified crosslinking density to produce a plastic web. After cooling the plastic web is heated by creating a temperature decreasing towards its core and stretched at core temperature below crystalline melting temperature of partially crystalline and crystalline polymers resulting in a distribution of orientation over the full section of the plastic web. Resistance to tearing will be essentially increased in this manner based on a simple, low-cost production process.

15 Claims, 2 Drawing Sheets

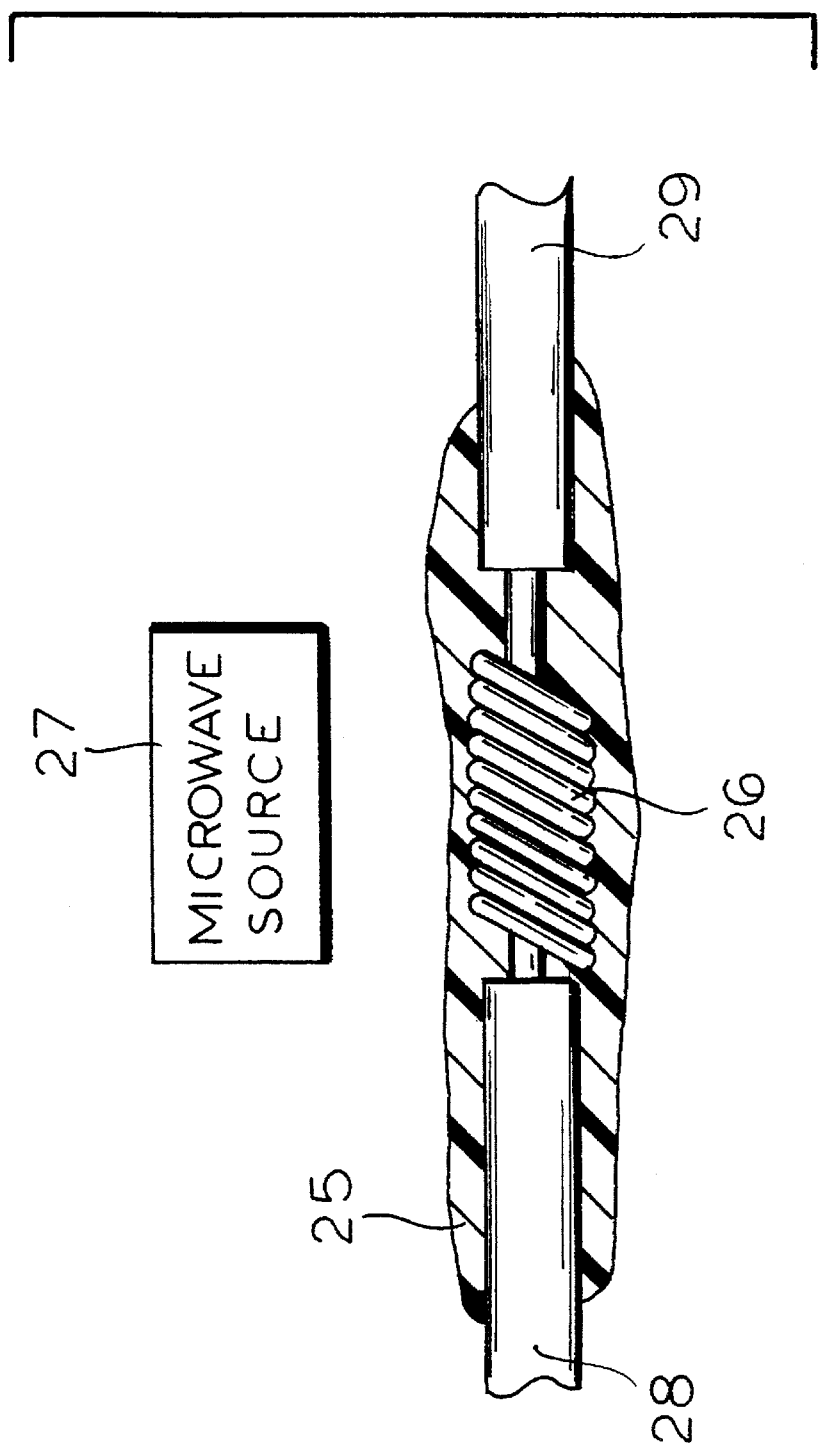

PROCESS TO INCREASE THE RESISTANCE TO TEARING OF A HEAT-RESETTABLE MATERIAL WEB

FIELD OF THE INVENTION

The present invention relates to a process for producing a heat-shrinkable web for wrapping cable joints or the like and to the material which results from the method and used in it. More particularly this invention relates to a process to increase the resistance to tearing of a heat-resettable material web to produce a heat shrinkable sheath, especially for cable joints and/or cable junctions based on a plastic web consisting of a crosslinkable polymer, with the plastic web being produced by extrusion, crosslinked, stretched under heat and finally cooled in stretched condition.

The term "resettable" is here used to refer to a web or material with memory such that it stably retains its stretched state of the manufactured product but shrinks back to prestretching dimensions upon heating in use.

BACKGROUND OF THE INVENTION

In similar procedures such as are known from DE-OS 38 06 660, a constant problem consists of increasing the resistance to tearing of a heat-resettable collar and/or web. For this purpose, the heat-resettable collar consists of a crosslinked polymer tape, the top side of which includes a co-extruded thermoplastic polymer coating followed by another layer of a thermoplastic polymer.

In order to increase its resistance to tearing, a fabric is inserted between these two layers and/or is arranged in the top layer. In addition to the fact that the known process is expensive and costly, there is an additional problem that heat-resettable material webs including fabrics will require a higher input heat during heat shrinking in comparison with a material web without a fabric. Moreover, the known collars and/or material webs are hard to open after shrinking due to the presence of the inserted fabric.

The forming of a heat-resettable web including a polymer top coating, a heat-resistant crosslinked layer and a heat-shrinkable reset layer is also known from DE-OS 41 26 355. In this case the heat-resettable layer consists of a crosslinked, stretched plastic web divided in shrinking direction by means of dividing sections penetrating the plastic web by forming shrink bands of a specific width. This ensures high resistance to tearing of the material web in solid and even molten condition together with the heat-stable crosslinked layer.

A process for the manufacture of heat-shrinkable sleeves from crosslinked plastics by extruding a sleeve at a temperature below crosslinking temperature of the plastic is known from AT-E 2939, with the sleeve being heated to at least crosslinking temperature, achieving the required diameter by subsequent expansion and simultaneous cooling of the sleeve. The extruded sleeve is cut to length. This length essentially corresponds to the finished sleeve or a multiple of the same. The cut sleeves are then heated to crosslinking temperature of the plastic while being retaining both on their outside and inside. Furthermore, the crosslinked sleeve will be expanded while simultaneously being cooled, to the required sleeve diameter around two or several rotating rollers arranged in parallel to each other, which are revolving away from each other. This is to eliminate problems in shape stability and uneven expansion of the sleeve.

Finally, a process for the production of crosslinked shrink tubes is known from DE-OS 27 19 308 in which the tube material is chemically crosslinked within the inflating zone in which the tube diameter is still limited to a rather small value, with a crosslinking agent blended into the plastic, such as peroxide, being caused to react by application of heat.

OBJECTS OF THE INVENTION

It is therefore an object of the present invention to provide an improved process for making a heat-shrinkable web whereby drawbacks of earlier methods are avoided.

Particularly, it is an object to provide an improved process for making such a web so that it will have increased resistance to tearing and will, when tearing is required, tear cleanly.

Another object is to provide an improved material for use in such a process and, in addition, an improved heat-shrunk wrapping.

It is a further object to provide a process of the above described type according to which, based on a simple and low-cost production process, a significant increase in tear stability and smooth opening of the shrink product and/or the shrunk-on sheath will be achieved.

SUMMARY OF THE INVENTION

These objects are achieved according to the invention in that a polymer or polymer blend is extruded at operating temperature with a defined stable or temporary crosslinking density characterized by the rubber-elastic modulus, followed by cooling the resulting plastic web, then followed by heating the plastic web by generating a temperature decreasing in relation to its core or towards the side opposite the heat source and stretching it at the temperature of the core or of the side opposite to the heat source below the crystallite melting temperature of a partially crystallized polymer or polymer blend and/or below the glass temperature of amorphous polymers or polymer blends to an orientation effected over the full section of the plastic web.

Orientation is the direction of structural elements in a space. In this case structural elements are molecular segments, molecules and higher level structures such as crystals, etc. In the case of a simple orientation, i.e. a monoaxially stretched polymer sample, the position of the molecules/molecular segments is determined by a cylindrically symmetric distribution of their axis around the direction of stretch in addition to their center of gravity. For flat products such as shrink foil, a preferably flat orientation of molecular segments and/or of crystallites exists which need not always be coinciding. For definition of orientation, the shrinking process and an X-ray examination are employed as suitable methods.

The process of X-ray wide-angle scattering (WAXS) is the preferred process for a quantitative assessment of orientation. The intensity of diffracted X-rays based on diffraction angles of between 5° and 15° will be continuously recorded for quantitative assessment of the orientation, with the sample rotating around its vertical axis. Typical crosslinking levels can be recognized for plastics. Interference peaks are superimposed by variations in intensity resulting from the rotation of the sample around its vertical axis and characterizing the orientation of individual crosslinking levels in a partially crystalline material. The degree of orientation according to KAST is determined in a simplified way for quantitative evaluation of X-ray diffraction tests. The degree of orientation $f_x$, a measure for the alignment of the vertical axis of crosslinked levels in a certain direction, will result in the following depending on the substrate correction from the relation between the average intensity h and the maximum intensity $h_{max}$ of diffracted X-rays:

$$f_x = 1 - \frac{h}{h_{max}}. \tag{3}$$

Initially the invention is based on the fact that only flexibly crosslinked polymers or polymer blends can be reshrunk after stretching and are therefore heat-resettable.

The molecules of these polymers or polymer blends exist in a molten or dissolved condition as balls intertwined with each other. This leads to a large number of contacts of the molecules with each other and therefore to interweaving. Contacts increase with reductions in temperature due to the molecules moving closer to each other, and/or regular structures of higher bonding energy are formed between the molecules, such as crystals. At a certain temperature and for a certain period of time all of these contacts have a crosslinking effect and are called temporary crosslinkings.

While temporary crosslinkings resulting from an arrangement in a space (interweaving) show continuous changes due to temperature, temperature-based crosslinkings resulting from energy-based contacts, such as crystals will degrade at melting point. Should relaxation times for degradation of temporary crosslinkings exceed stress times, i.e. shrink times, temporary crosslinkings behave like stable chemical crosslinkings and can no longer be distinguished from these in their mechanical behavior. Crosslinking in molten condition and/or in a temperature range above the glass transition temperature of amorphous plastics are important for shrinking, and therefore only crosslinkings above glass and/or melting temperature are of importance in order to characterize shrinking materials.

Therefore polymers or polymer blends are extruded within the scope of the invention including a sufficient number of stable and temporary crosslinkings, characterized by the magnitude of the rubber-elastic modulus, with their relaxation time being longer than stress times during subsequent heat shrinking in order to obtain clearly rubber-elastic characteristics of the extruded material in molten condition.

More particularly, the process of the invention can comprise:

(a) extruding a crosslinkable polymer composition at a processing temperature and with a certain cross-linking density corresponding to a rubber-elastic modulus of substantially $10^{-4}$ N/mm$^2$ to 10 N/mm$^2$ to form a base web;

(b) subsequently cooling the base web;

(c) heating the base web by exposing a side thereof to a heat source to create a temperature gradient across a thickness of the base web which is of reduced temperature away from the side toward a core of the base web;

(d) hot stretching the base web at a lowest temperature of the gradient which is below a crystallite temperature of any crystalline polymers of the composition and a glass transition temperature of any amorphous polymers of the composition, thereby imparting an orientation to the base web over a full cross section thereof; and (e) thereafter cooling the base web to produce a heat-shrinkable web of high tear resistance capable of being heat shrunk around the object.

As a result and due to actions taken based on the invention, a heat-resettable material web can be produced simply and at low cost as the invention will eliminate the complicated inclusion of tear-reducing agents. The important increase in resistance to tearing in comparison with standard shrink products is achieved by stretching and subsequent shrinking of a polymer or polymer blends based on a specified crosslinking density (temporary and stable crosslinkings), characterized by the rubber-elastic modulus, with the polymer or polymer blend still maintaining a high shrink force due to an appropriately low stretching temperature.

The material web manufactured according to the invention is a cold-stretched plastic web, the structured areas of which such as crystals, based on an orientation distribution over the full cross section of the plastic web due to their stretching temperatures being below crystallite melting point and/or glass temperature, act as multifunctional crosslinking points.

A higher shrink tension than for a stretching temperature above the crystallite melting point will result during appropriate stretching and/or elongation of the plastic web in a final heat shrinking process. In this way the heat-resettable plastic and/or material web according to the invention will shrink with a low loss of energy at relatively low temperatures and very fast.

During the heat shrinking process the structured areas and crystallites are destroyed with increasing heat. The number of crosslinking points is drastically reduced, and shrinking stress will drop to a value corresponding to the value of temporary and stable crosslinkings in this temperature and time range. This shrink tension is then so low, due to a rather low number of crosslinkings, that propagation of a tear is a very slow process and tears may not be propagated at all.

According to a feature of the invention, we use a polymer or polymer blend of such a high molecular weight, when expressed by the rubber-elastic modulus, that crosslinkings still stable during shrinking exist in sufficient numbers. However, there is also a possibility that the crosslinking density of the polymer or the polymer blends will be appropriately increased before extrusion and/or during extrusion and/or after extrusion by high-energy radiation and/or chemical agents such as peroxides, sulphur compounds, a phenolic vulcanizing system, crosslinking accelerators alone or in mixtures or based on a combination of individual methods.

According to another feature of the invention, a partially crystalline plastic or plastic blend is used, the crystalline melting temperatures of which are above shrinking temperature, with unmolten larger crystals acting as stable crosslinkings.

A polymer or polymer blend of crosslinking density, characterized by a rubber-elastic module within a range of $10^{-4}$ N/mm$^2$ to 10 N/mm$^2$, will be preferably used. Technical testing of the crosslinking density of temporary and stable crosslinkings is strongly dependent on the test method.

A number of methods are known to test crosslinkings. The most important ones from a technical point of view are:

| mechanical tests | balanced tensile test |
| --- | --- |
|  | hot-set |
| swelling | balanced swelling |
|  | gel content. |

The following methods are known for testing temporary crosslinkings:

| mechanical tests | static module, preferred under tension |
| --- | --- |
|  | dynamic module, preferred for confirmation |
|  | a maximum degree of stretch |
| viscosity tests |  |
| Testing of ball diameters. |  |

Sufficient agreement based on temporary crosslinkings tested by different methods will always result when the test method agrees well with the actual load. Therefore in this case of uniaxial stretching and/or shrinking a tensile module is used for characterization.

In order to calculate the rubber-elastic modulus from rheologic stretch tests, a Meiβner rheometer can be used. In addition to testing the tension/total stretch context, the reversible expansion proportion is determined by shrinking of individual samples of different total elongation.

$$\lambda_{total} = \lambda_{irrev} + \lambda_{rev} \quad (1)$$

$\lambda_{total}$=total expansion $\lambda_{irrev}$=irreversible expansion $\lambda_{rev}$=reversible expansion Based on these results, the application of tension in contrast to reversible (elastic expansion) in the rubber-elastic deformation dimension of: $\lambda^2_{rev} - \lambda_{rev}^{-1}$ allows calculation of the rubber-elastic modulus. Irrespective of the smaller expansion range, a linear curve of tension will result from reversible expansion in accordance with the theory.

In order to calculate expansion-based moduli, linear extrapolation was based on an expansion speed of $\dot\epsilon = 0$.

Based on the following equation (2), the rubber-elastic modulus $E_k$ can be calculated.

$$E_k = \frac{\sigma w}{\lambda^2_{rev} - \lambda^{-1} \text{rev}} \quad \dot\epsilon \; 0 \quad (2)$$

$\sigma W$=true tension $\epsilon$=expansion speed $E_k$=rubber-elastic modulus

In this case a tensile test including extrapolation to a pull-off speed of zero and separation of flow effects are used as a test method. The crosslinking density is based on the rubber-elastic modulus at a test temperature of 150° C.

In addition, the invention specifies that the plastic web is incompletely or completely cooled after extrusion. Incomplete cooling to approx. 60° to 70° C. does, for instance, occur when the plastic web is processed soon after extrusion while complete cooling means cooling to ambient temperature when the extruded plastic web is taken into intermediate storage, for instance before further processing.

During further processing the invention provides that the extruded plastic web is heated on one or both sides in order to create a temperature decreasing towards the core or the side opposite the heat source. Such heating is performed regularly at a temperature of 5° to 50° C. above crystallite melting temperature of the partially crystalline polymer component reducing relaxation of orientations formed due to stretching on the heated surfaces of the plastic web down to tension values created by stable crosslinkings. This will further increase resistance to tearing.

According to an aspect of the invention which is of independent importance, a plastic web including peroxide and consisting of a crosslinkable polymer, is extruded at a temperature below the reaction temperature of the peroxide component, followed by partial crosslinking of the plastic web and cold-stretching at a temperature below crystallite melting point and/or within the transition from the glass to the rubber-elastic range of the partially crosslinked plastic web, with the plastic web finally being fully crosslinked during subsequent heat shrinking.

This is another way of producing a heat-resettable material web in a simple and low-cost manner as the invention will eliminate the complicated addition of tear-reducing agents. The important increase in resistance to tearing in comparison with standard shrink products is achieved by shrinking a relatively small quantity of crosslinked plastic which will develop, however, a high shrink force due to an appropriately lower stretching temperature.

Crosslinking may be achieved by radiation, a peroxide from a blend of several different peroxides effecting a fast and complete reaction and/or by a slowly reacting peroxide only reacting partially, by a peroxide silane blend and storage at suitable temperatures and humidity. The density of chemical crosslinkings, calculated from shrink stress and/or hot-set tests, are $2 \times 10^{13}$/mm$^3$ to $2.5 \times 10^{11}$/mm$^3$ for partially crosslinked materials.

("Chemical crosslinking" is the main valance combination of two or more molecules, while intertwining and/or a secondary valance combination such as crystals are "physical crosslinking"). There is a direct connection between the crosslinking density and the resulting tensile and/or shrink stress in an ideal rubber. The behavior of chemically crosslinked polymers is nearly rubber-elastic at a sufficiently high level above glass and melting temperatures. Genuine tension is calculated by $$\sigma_w = E_k \cdot \lambda^2 - \lambda^{-1}$$

$\sigma_w$ true tension (energy/actual area)

$E_k$ rubber-elastic modulus $\lambda$ degree of stretch $$\lambda = \frac{L_o}{L_1}$$

$L_o$ length before deformation $L_1$ length after deformation $E_k = 3 \; N \; k \; T$ k Boltzmann constant T Absolute temperature N crosslinked density The shrink tension cycle as applicable to a cold-stretched material in comparison with a material stretched above melting temperature, can be explained by the fact that the structured areas and/or crystallites act as multifunctional crosslinking points at a stretching temperature below the crystallite melting point and/or in the transitional range from the glass to the rubber-elastic condition. During the final heat shrinking process therefore a higher shrink stress than in molten condition will result from appropriate stretching and/or expansion of the plastic web, i.e. when stretched at a temperature above crystallite melting point. In this case the heat-resettable material web according to the invention will shrink very quickly. During heat shrinking the structured areas and/or crystallites will be destroyed with increases in temperatures and shrink stress will be reduced to a value corresponding to chemical crosslinking. This tension resulting from chemical crosslinking only, is so low due to minimum crosslinking that propagation of a tear, if it occurs at all, is very slow. During heat shrinking a secondary stable crosslinking is created by the non-reacting peroxide, fixing the shrunk-on sheath and counteracting the creation of tears and/or eliminating the propagation of tears.

In addition, the extruded material should preferably be a mixture of the main polyethylene (PE) components (0 to 95%), blended ethylene polymerizates, such as EVA, EMA, mixed fluorine polymerizates, mixed chlorine polymerizates and similar (0 to 95%), ethylene/propylene-copolymer and/or terpolymer (EPM/EPDM) of 0 to 95%, soot (carbon black) of 3 to 25%, stabilizers and flame retardants of 1 to 20% and at least one peroxide, e.g. a hexamethyl-1,2,3,5-tetraoxacyclononane (HMCN) peroxide and/or a blend of other fast reacting peroxides such as dicumylperoxides.

In addition, the peroxide should preferably be included during compounding of the main components or in the compounded extrusion material. For this purpose a blend of peroxides of different reaction temperatures could also be used.

Partial crosslinking of the plastic web may be effected by radiation, immersion in a saline solution for peroxides or in steam and/or by silanes, with the crosslinking density and/or the degree of crosslinking being adjustable for a specific peroxide volume based on the cycling time in saline solution (steam bath) and temperature.

Partial crosslinking may also be performed during temperature-based calibration including surface lubrication and/or microwave heating and simultaneous cooling. This is done in a heated water bath for saline peroxide blends. The crosslinking density and/or the shrink stress is tested at a polyethylene test temperature of 200° C. and for plastic blends such as ethylene/propylene at temperatures exceeding the crystallite melting temperature by 80° C. during a tensile or relaxation test.

In addition, the partially crosslinked plastic web can be heated in a heated fluid such as oil, oil blends or the like or for instance by microwaves to a temperature below crystallite melting point, i.e. below the melting temperature of crystalline ranges and/or in the transition from the glass to the rubber-elastic range and after expansion to stretching dimensions.

Complete crosslinking of the cold-stretched plastic web during the heat shrinking is preferably effected based on the time and temperature of the heat treatment for a specific peroxide volume by using an indicator on the surface of the plastic web.

The invention also includes a material web to produce a shrunk-on sheath, in particular for cable joints and cable junctions based on an extruded plastic web including a peroxide, consisting of a crosslinkable polymer, wherein the plastic web is produced from an extruded material consisting by weight of a blend of main components such as polyethylene of 0 to 95%, preferably 60 to 80%, ethylene blend polymerizates of 0 to 95%, preferably 10 to 20%, ethylene propylene copolymerizates or terpolymerizates of 0 to 95%, preferably 5 to 20%, soot of 3 to 25%, stabilizers and flame retardants of 1 to 20%, peroxide or a peroxide blend of 0.2 to 20%.

This will provide a material and/or plastic web based on a material which is easy to partly crosslink and cold stretch, resulting in a heat-resettable material web for post-crosslinking during subsequent heat shrinking.

The web can consist essentially of an extruded material containing at least one crosslinkable polymer and at least peroxide constituting a crosslinking agent and reactive with the crosslinkable polymer during heat shrinking of the sheath on the cable joint, the material consisting essentially of 0 to 95% by weight of polyethylene, 0 to 95% by weight ethylene polymerizates, 0 to 95% by weight of ethylene-propylene copolymers or terpolymers, 3 to 25% by weight carbon black, 1 to 20% by weight stabilizers and flame retardants, and 0.2 to 20% by weight of at least one peroxide.

Partial crosslinking will succeed by using a slow-reacting peroxide or a peroxide in a blend of different peroxides due to fast and complete reaction based on suitable storage with reference to temperature and humidity. In this case, "chemical crosslinking" will take place, which refers to main valance bonding of two or several molecules. Chemically crosslinked polymers show a nearly rubber-elastic behavior sufficiently high above glass and/or crystallite melting temperature. During heat shrinking another stable crosslinking will be created by nonreacted peroxide to fix the shrunk-on sheath, eliminating the creation of propagation of tears.

In any case, a heat-resettable material web can be produced from a material and/or plastic web according to the invention characterized by a clearly greater resistance to tearing even without the complicated inclusion of anti-tear agents. This is achieved in a rather simple and low-cost manner.

Furthermore, a slow-reacting peroxide such as a hexamethyl-1,2,3,5-tetraoxacyclononane (HMCN) peroxide and/or a blend of other fast reacting peroxides such as dicumylperoxides could be used. The peroxide should preferably be included during compounding of the main components or into the compounded extrusion material. This could also include the addition of a hygroscopic material. Partial crosslinking of the plastic web according to the invention may be performed in a saline solution or in steam because of the peroxide or peroxide blend, with the crosslinking density and/or the degree of crosslinking for a specific peroxide volume being adjustable by the saline solution (steam) cycle and temperature. In this case the crosslinking density and/or the shrink stress is tested at a temperature for polyethylene of 200° C. and for plastic blends such as ethylene/propylene at temperatures exceeding crystallite melting temperature by 80° C., in a tensile or relaxation test. The density of the partial crosslinking may, for instance, amount of $2 \times 10^{13}/mm^3$ to $2.5 \times 10^{11}/mm^3$ in the material and/or plastic web according to the invention. Moreover, the density of the crosslinking achieved by post-crosslinking of the plastic web, partially crosslinked and cold stretched after extruding, may amount to $2 \times 10^{11}/mm^3$ to $5 \times 10^9/mm^3$.

As a brief explanation of the significance of the rubber-elastic modulus to the cross linking density it can be noted that according to ideal rubber theory $$\sigma_w E_k \lambda^2_{rev} - \lambda^{-1}_{rev}$$

with $$E_k = 3 \, N \, k \, T$$

it is possible to use the rubber-elastic modulus at a given temperature synchronous with the temperature invariant magnitude of the cross linking density. Thus for a modulus value at 170° C. of $1 \times 10^{-4}$ N/mm$^2$, the crosslinking density of $8 \times 10^{12}/mm^3$ and for a modulous value at 170° C. of 10, a cross linking density of $8 \times 10^{16}/mm^3$ can be taken as equivalent. It is customary to work the synthetic resin material with peroxide at a temperature less than 180° C. in an extruder since otherwise crosslinking of the material by the peroxide results. A complete or partial crosslinking of the material occurs at temperatures of 185° C. to 300° C. and, for the compositions described here based upon our experiments, at 210° C. to 280° C.

Extrusion speeds for the purposes of the present invention are dependent upon the material and lie in the range of 0.5 m/min to 7 m/min. For the materials here described and tested by us extrusion speeds of 3±2 m/min found to be realistic. The degree of stretch (preferably uniaxial) were minimized in the longitudinal direction and maximum perpendicular to the longitudinal direction in the plane of the stretched web and could be effected on a continuous stretching frame operating at a speed of 3–10 m/min. This corresponded to a speed of stretching in the stretching direction of 0.1 to 2 m/min. The degree of stretching (ratio of stretched width to original width), could range between 2.5 and 10 but preferably was 2.5 to 7.

BRIEF DESCRIPTION OF THE DRAWING

The above and other objects, features, and advantages will become more readily apparent from the following description, reference being made to the accompanying drawing in which:

FIG. 2 is a cross sectional view of a cable connection showing the application of the web.

SPECIFIC DESCRIPTION

Figure 1:
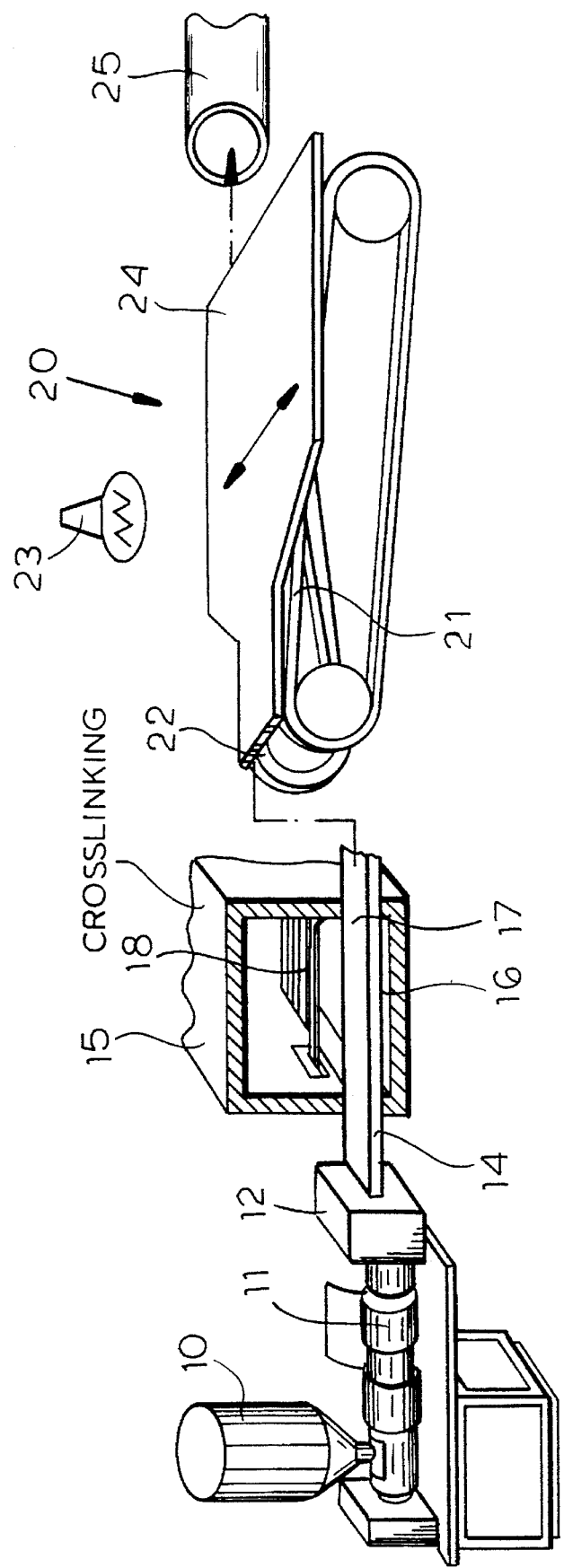
FIG. 1 is a diagrammatic cross sectional view illustrating a method of making the heat shrinkable web of the invention.

From FIG. 1 it will be apparent that the compounded polymer or polymer blending containing the peroxide crosslinking agent can be extruded from a hopper 10 by an extruder 11 having an extruded extrusion head 12 in the form of an extruded web 14.

The hot web is subjected to crosslinking in a heating unit 15 which can be a microwave or radiant heater. If a radiant heater is used, the heating element 18 is disposed on only one side of the web to establish a temperature gradient across the web so that at the side 16 opposite the side 17 subjected to heating, a reduced temperature prevails. This reduced temperature is below a crystallite temperature of any crystallite polymers of the extruded composition and the glass transition temperature of any amorphous polymers of the composition.

The extruded web is an at most partially crosslinked web of the composition described which has the capacity for a crosslinking density of $2\times10^{13}/mm^3$ to $2.5\times10^{11}/mm^3$ and a modulus of substantially $10^{-4}$ N/mm$^2$ to 10 N/mm$^2$.

At the temperature brought about in the partial crosslinking stage 15 the web is stretched on a stretching frame 20 comprising belts 21 and 22 which move apart so that there is minimum stretch in the direction of travel of the web and maximum stretch transversely thereto. Heating lamps 23 or the like heat the web during the stretching operation. The stretched web is cooled by quenching blowers not shown to heat the yielded shrinkable web 24.

The heat shrinkable web 24 can be formed into a sleeve 25 (FIG. 2) which is fitted over a cable joint 26 and shrunk onto the latter by, for example, microwave energy from the microwave force 27 which can also complete crosslink the composition to the crosslinking density mentioned previously.

The cable connection 26 can connect cables 28 and 29.

Details of the heat shrinkable sleeves for cable splices and junctions can be found in the commonly owned application Ser. No. 07/984,923 filed 3 Dec. 1992 now U.S. Pat. No. 5,413,790 of 9 May 1995.

SPECIFIC EXAMPLE

The basic material is a blend of two polymers, amounting to 89% of the total material, 11% of crosslinking accelerators, flame retardants and stabilizers. 80% of the polymer blend consists of low-density polyethylene and 20% of ethylene vinylacetate. The material including all additives will be compounded and granulated. After prior examination, the granules will be crosslinked by gamma rays until the rubber-elastic module is in an area of 1.5 to $10^{-3}$ N/mm$^2$. The crosslinked pellets are extruded at a temperature of 210° C. and a very low shear screw design. The plastic web or a similar section will be calibrated and cooled to ambient temperature, followed by stretching. For stretching the plastic web is surface-heated on one side by radiators to a surface temperature of 240° C. and the surface fused to a thickness of 0.8 mm. Stretching itself is performed, without additional heat at a temperature on the reverse of the plastic web of 70° C., to the required degree of stretch. After stretching, the plastic web and/or the material web which is now heat-resettable or the sleeve to coat cable joints and/or cable junctions, will be cooled and finished.

We claim:

1. A process for producing a heat-resettable web for use as a heat-shrinkable sheath about an object, said method comprising the steps of:

(a) extruding a crosslinkable polymer composition at a processing temperature and with a certain cross-linking density corresponding to a rubber-elastic modulus of substantially $10^{-4}$ N/mm$^2$ to 10 N/mm$^2$ to form a base web;

(b) subsequently cooling the base web;

(c) heating said base web by exposing a side thereof to a heat source to create a temperature gradient across a thickness of said base web which is of reduced temperature away from said side toward a core of the base web;

(d) hot stretching said base web at a temperature of a lower part of said gradient which is below a crystallite temperature of any crystalline polymers of said composition and a glass transition temperature of any amorphous polymers of said composition, thereby imparting an orientation to the base web over a full cross section thereof; and (e) thereafter cooling said base web to produce a heat-shrinkable web of high tear resistance capable of being heat shrunk around said object.

2. The process defined in claim 1 wherein polymers of said composition are of a high molecular weight sufficient to ensure stable crosslinkings upon shrinking of said heat-shrinkable web about said object.

3. The process defined in claim 1, further comprising the step of increasing the crosslinking density of said composition prior to heating said base web in step (c) by subjecting said composition to high-energy radiation.

4. The process defined in claim 1 wherein at least one chemical agent promoting crosslinking is incorporated in said composition, said chemical agent being selected from the group which consists of a peroxide, a sulfur compound, a phenolic vulcanizing system and a crosslinking accelerator.

5. The process defined in claim 1 wherein said base web is only partially cooled in step (b).

6. The process defined in claim 1 wherein said base web is heated on both sides in step (c) so that said gradient decreases from each of said sides toward a core of said base web.

7. The process defined in claim 1 wherein said composition includes a peroxide as a crosslinking agent, the composition is extruded in step (a) at a temperature below a reaction temperature of the peroxide, and crosslinking of said composition is completed only while said heat-shrinkable web is being heat shrunk around said object.

8. The process defined in claim 7 wherein a blend of peroxides of different reaction temperatures and reaction times is incorporated into said composition.

9. The process defined in claim 7 wherein said composition is partially crosslinked prior to being heat shrunk around said object by radiation, at least one peroxide or at least one silane.

10. The process defined in claim 7 wherein the base web is partially crosslinked by a peroxide in a saline solution of steam, said process further comprising adjusting the crosslinking density and degree of crosslinking by selecting a corresponding peroxide reaction time and temperature.

11. The process defined in claim 7 wherein a partial crosslinking of said composition is effected during a heated calibration with surface lubrication of said base web.

12. The process defined in claim 7 wherein a post-crosslinking of said composition is effected by simultaneous microwave heating and surface cooling thereof.

13. The process defined in claim 7 wherein said base web is partially crosslinked and is stretched in step (d) in a heated fluid.

14. The process defined in claim 13 wherein said heated fluid is an oil.

15. The process defined in claim 7 wherein said base web is heated by microwaves in step (c).

* * * * *